US010347162B2

(12) United States Patent
McGrath et al.

(10) Patent No.: US 10,347,162 B2
(45) Date of Patent: Jul. 9, 2019

(54) MULTI-PANEL DISPLAY PROJECT BOARD WITH INTEGRAL HEADER AND FOOTER WHOSE PANELS PIVOT

(71) Applicant: Royal Consumer Products LLC, Norwalk, CT (US)

(72) Inventors: Craig McGrath, Pawling, NY (US); Steven A. Schulman, Norwalk, CT (US)

(*) Notice: Subject to any disclaimer, the term of this patent is extended or adjusted under 35 U.S.C. 154(b) by 0 days.

(21) Appl. No.: 16/172,336

(22) Filed: Oct. 26, 2018

(65) Prior Publication Data

US 2019/0088172 A1   Mar. 21, 2019

Related U.S. Application Data

(63) Continuation-in-part of application No. 16/115,814, filed on Aug. 29, 2018, now Pat. No. 10,297,175, and a continuation-in-part of application No. 15/784,034, filed on Oct. 13, 2017, now Pat. No. 10,170,024, and a continuation-in-part of application No. 15/784,040, filed on Oct. 13, 2017, now Pat. No. 10,163,378.

(60) Provisional application No. 62/560,844, filed on Sep. 20, 2017.

(51) Int. Cl.
| | |
|---|---|
| *G09B 29/00* | (2006.01) |
| *G09F 15/00* | (2006.01) |
| *B32B 27/06* | (2006.01) |
| *G09F 7/18* | (2006.01) |
| *B32B 5/18* | (2006.01) |

(52) U.S. Cl.
CPC ............ *G09F 15/0068* (2013.01); *B32B 5/18* (2013.01); *B32B 27/065* (2013.01); *G09F 7/18* (2013.01); *G09F 15/0006* (2013.01); *B32B 2457/20* (2013.01)

(58) Field of Classification Search
USPC ..... 434/408, 413, 434, 428, 430; 40/124.09, 40/124.12, 124.14, 539, 610
See application file for complete search history.

(56) References Cited

U.S. PATENT DOCUMENTS

| | | | | |
|---|---|---|---|---|
| 4,759,520 | A * | 7/1988 | Levine | A47G 5/00 160/114 |
| 5,293,705 | A * | 3/1994 | Wood | G09F 15/0062 40/124.191 |
| 5,632,390 | A * | 5/1997 | Podergois | A47F 5/116 211/149 |
| 5,911,522 | A * | 6/1999 | Wood | G09F 15/0062 40/124.09 |

(Continued)

*Primary Examiner* — Kurt Fernstrom
(74) *Attorney, Agent, or Firm* — Robert J. Hess; Hess Patent Law Firm

(57) ABSTRACT

A multi-panel display board that has a plurality of panels, which include a central panel, two transition panels, two side panels, a header panel and a footer panel. The header panel and the footer panel each flex in an analogous manner with each other between a fold-in orientation and a fold-out orientation and they extend from panel creases that lie between the side panels and the transition panels. The central panel is between the transition panels and separated from them by transition creases. Both the header panel and footer panel have segment creases about which portions of them pivot. A platform extends over the footer panel and simultaneously extends underneath the two transition panels and the central panel.

13 Claims, 13 Drawing Sheets

(56) References Cited

U.S. PATENT DOCUMENTS

| | | | | |
|---|---|---|---|---|
| 5,960,848 | A | * | 10/1999 | Schirer ............... G09F 15/0068 |
| | | | | 160/135 |
| 7,451,800 | B2 | * | 11/2008 | Johnson ............. G09F 15/0068 |
| | | | | 160/135 |
| 7,823,309 | B2 | * | 11/2010 | Albenda .............. A47B 96/202 |
| | | | | 206/736 |
| 8,955,243 | B2 | * | 2/2015 | Dashe ....................... G09F 1/06 |
| | | | | 40/539 |
| 2005/0086842 | A1 | * | 4/2005 | Ternovits ............ G09F 15/0012 |
| | | | | 40/539 |
| 2006/0048421 | A1 | * | 3/2006 | Oleksak ............. G09F 15/0068 |
| | | | | 40/610 |

* cited by examiner

MULTI-PANEL DISPLAY PROJECT BOARD WITH INTEGRAL HEADER AND FOOTER WHOSE PANELS PIVOT

CROSS-REFERENCE TO RELATED APPLICATIONS

The present application asserts the benefit of priority from U.S. provisional patent application No. 62/560,844, filed Sep. 20, 2017 and is a continuation-in-part of U.S. utility patent application Ser. No. 15/784,034, filed Oct. 13, 2017, U.S. utility patent application Ser. No. 15/784,040, filed Oct. 13, 2017, and U.S. utility patent application Ser. No. 16/115,814, filed Aug. 29, 2018.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE

Not applicable.

BACKGROUND OF THE INVENTION

1. Field of Endeavor to which the Invention Pertains

The invention pertains to a multi-panel display project board that has a central panel, two pivoting transition panels, two pivoting side panels, an integral header panel and an integral footer panel. The integral header panel and the integral footer panel each flex between fold-in and fold-out orientations.

2. Description of Information Known to the Inventor, Including References to Specific Documents Related to the Invention, and Specific Problems Involved in the State of Technology that the Invention is Drawn Toward The contents of the following patent applications are incorporated herein by reference: U.S. provisional patent application No. 62/560,844; U.S. utility patent application Ser. No. 15/784,034; U.S. utility patent application Ser. No. 15/784,040; U.S. utility patent application Ser. No. 16/115,814; and US published utility patent application no. 2005/0086842. Each of these patent applications disclose a project display board having a central panel and two side panels with an integral header extending from each of the two side panels. US published patent application no. 2005/0086842 also discloses an integral footer that pivots to serve as a support brace.

Users may prefer, however, that the header panel be no longer than the distance between panel creases that separate the side panels from more centrally located panels. It is desired, therefore, to extend header and footer panels of a multi-panel project display board from the panel creases and to form both the header the footer panels to flex in an analogous manner between fold-in and fold-out orientations.

BRIEF SUMMARY OF THE INVENTION

One aspect of the invention resides in a multi-panel project display board and a method of folding a blank into the multi-panel display project board. Such a board includes a central panel, two side panels, two transition panels that separate the central panel from the two side panels a header panel and a footer panel. The header and footer panels flex between fold-in and fold-out orientations in an analogous manner about segment creases. Two panel creases respectively separate the two side panels from the two transition panels and about which the side panels pivot. The footer and header panels extend from those panel creases.

The central, side, header and footer panels are formed of a single wallboard that has a medium between two linerboards. The medium is either corrugated cardboard, corrugated fiberboard, corrugated paperboard, foam core or cork core. The two linerboards include a non-mottled linerboard and a mottled linerboard.

To deploy, the side panels are pivoted relative to the central board about respective panel creases between a fully folded orientation and a spread-apart deployed orientation. In the fully folded orientation, the side panels lay over the central panel. In the spread-apart deployed orientation, the side panels and the central panel define respective angles of inclination between that are obtuse.

The side panels are unfolded so that the respective angles of inclination between the side panels and the central panel become obtuse. Thereafter, the header panel and the footer panel are flexed from their fold-in orientation to their fold-out orientation. In the fold-in orientation, the header panel and the footer panel each have their respective long segment and shorter segments define respective angles of inclination that are likewise obtuse angles of inclination that match those formed by the two side panels and the central panel accordingly. In the fold-out orientation, the header panel and the footer panel each have their respective long segment and shorter segments define respective angles of inclination that are reflex.

In other words, as the header panel and the footer panel are flexed to move between their fold-in and fold-out orientations, their respective long segment and shorter segments define respective angles of inclination the change between being obtuse (in the fold-in orientation) to being reflex (in the fold-out orientation).

BRIEF DESCRIPTION OF THE SEVERAL VIEWS OF THE DRAWINGS

For a better understanding of the present invention, reference is made to the following description and accompanying drawings, while the scope of the invention is set forth in the appended claims.

DETAILED DESCRIPTION OF THE INVENTION

Figure 1:
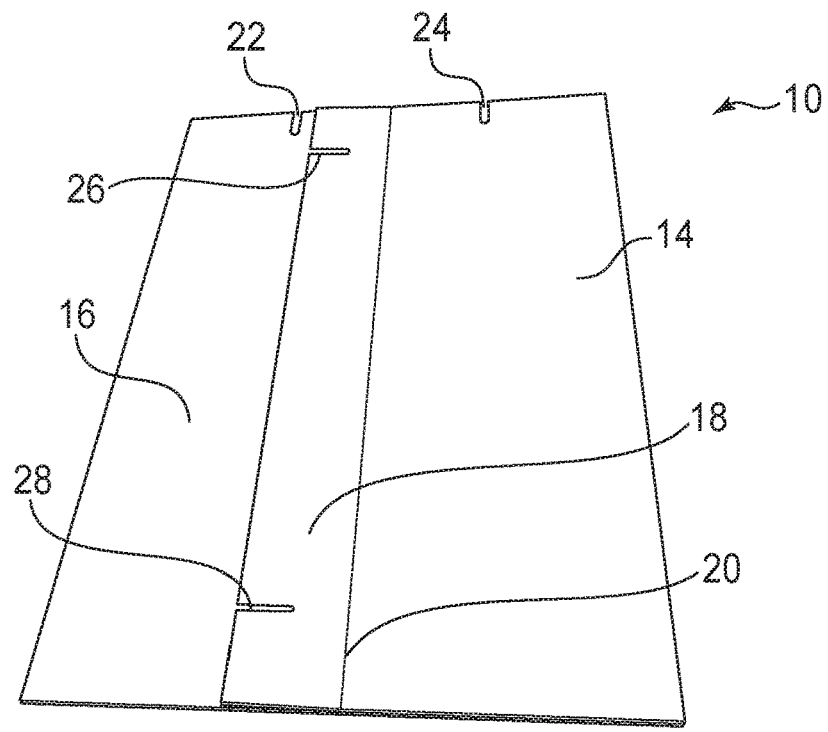
FIG. 1 is an isometric top view of a conventional display project board in a folded state with rear sides facing out.
Figure 2:
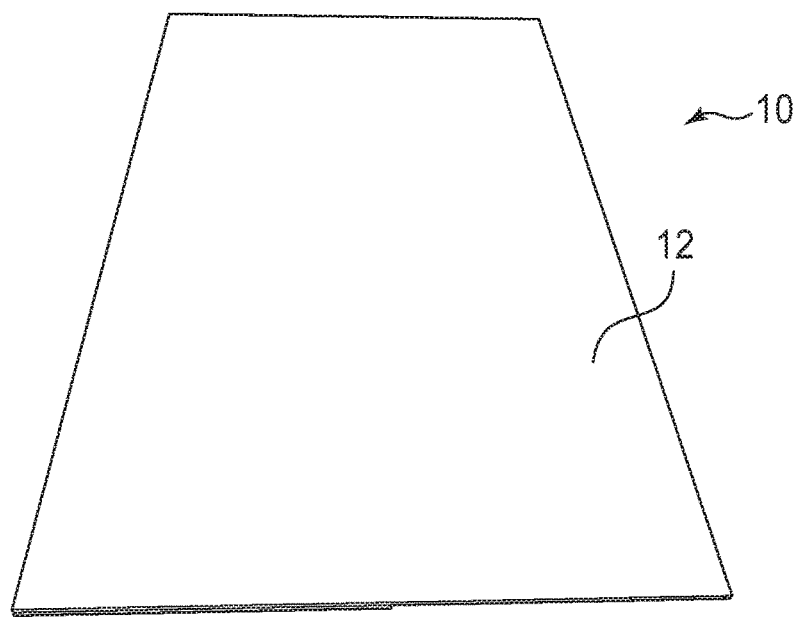
FIG. 2 is an isometric bottom view of the conventional display project board in the folded state of FIG. 1 with rear sides facing out.
Figure 3:
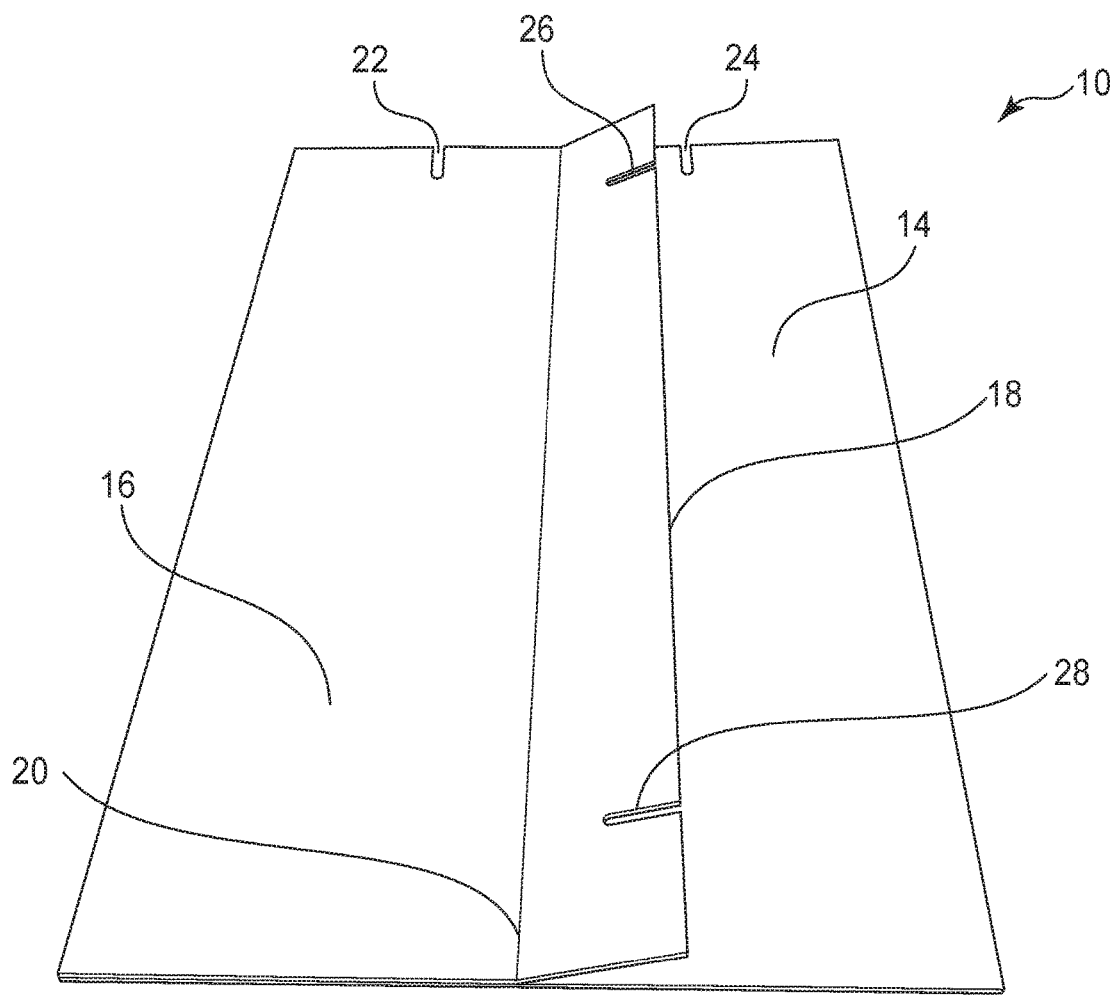
FIG. 3 is an isometric top view as in FIG. 1 but with the header panel partially folded back to show its front side.

Turning to the drawings, FIGS. 1-5 show progressive views to assemble a conventional multi-panel display project board 10 with a central panel 12, two side panels 14, 16 and a header panel 18 all commercialized together by Royal Consumer Products LLC. The display project board 10 is shipped in a folded state as shown in FIGS. 1 and 2. When unfolded fully, the display project board 10 takes on a planar flattened shape as shown in FIG. 3.

Figure 4:
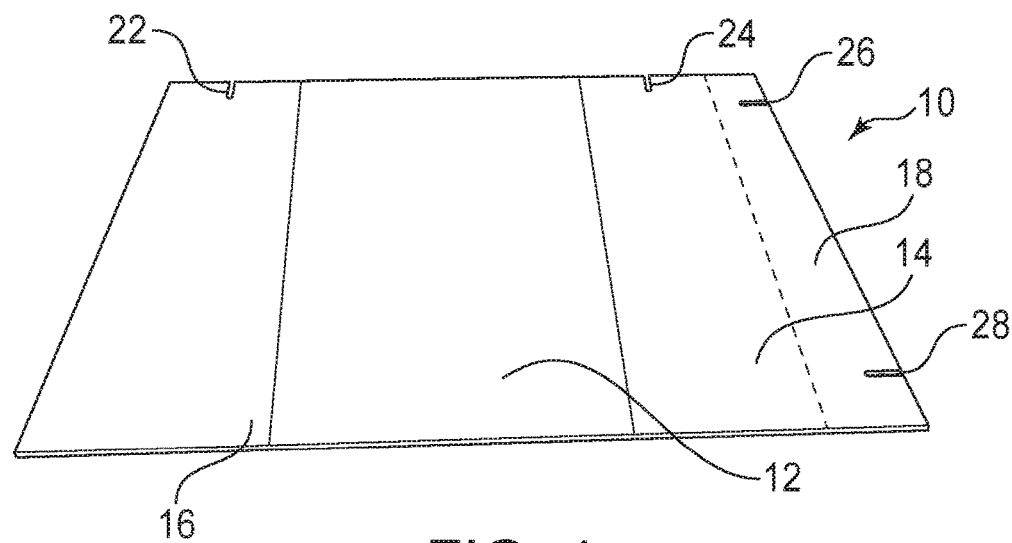
FIG. 4 is an isometric front side view of the conventional display project board of FIGS. 1, 2 and 3 but in a flattened state.
Figure 5:
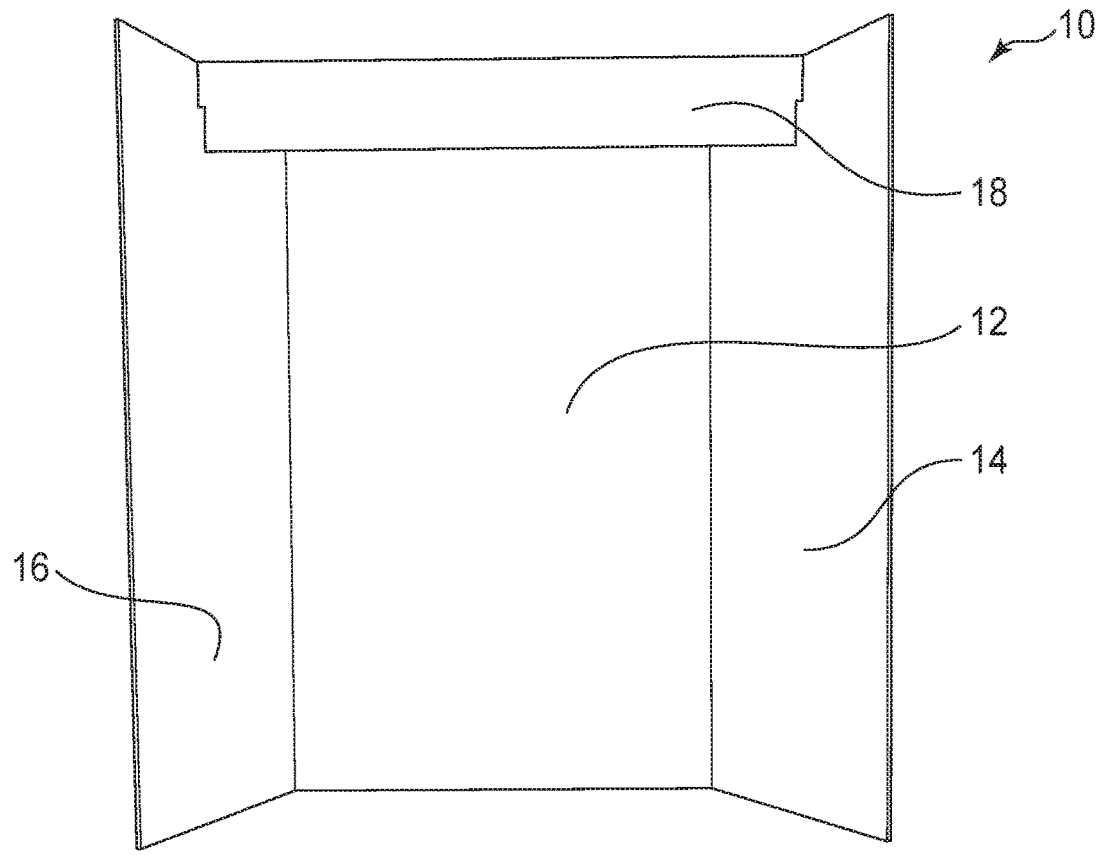
FIG. 5 is an isometric view of the conventional display project board of FIGS. 1-4 in a self-standing upright orientation with the header panel torn off from a side panel and secured into the top edges of the side panels.

As shown in FIG. 4, a header panel 18 is attached to one of the side panels 14,16 via perforations 20 and may be bent and severed along the perforations 20 to separate the header panel 18 from the rest of the multi-panel display project board. The central panel 12 separates two side panels 14, 16 by respective creases 22, 24. When the multi-panel display project board 10 is erected in the manner of FIG. 5 by swinging out its two side panels 14, 16 in the same direction relative to the central panel 12 to respective oblique angles, the header panel 18 may be fitted to the top edge of each of the side panels 14, 16 via a pair a slots or slits 26, 28 that complement corresponding slots or slits 30, 32 in the top edges of the two side panels 14, 16.

Figure 6:
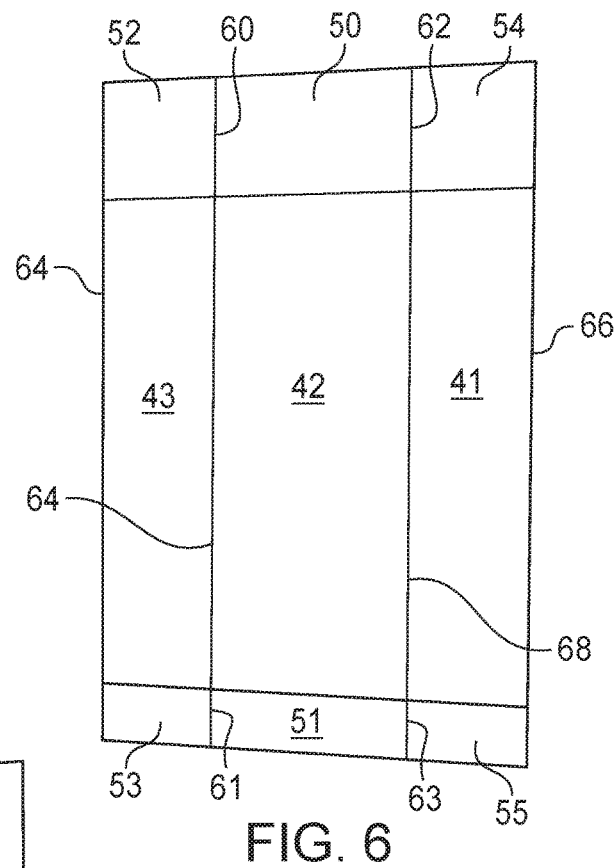
FIG. 6 is an isometric bottom view of a display project board in a folded state with rear sides facing out in accordance with the invention.
Figure 7:
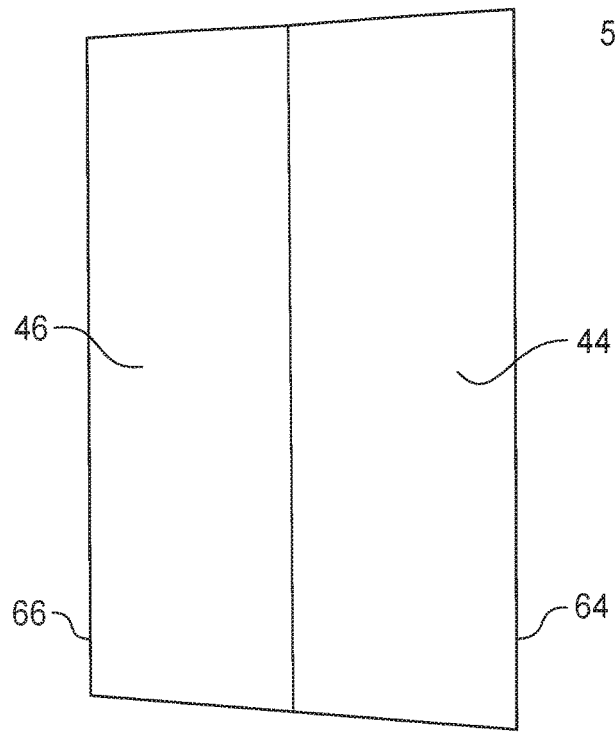
FIG. 7 is an isometric top view of a display project board in a folded state with rear sides facing out in accordance with the invention.
Figure 8:
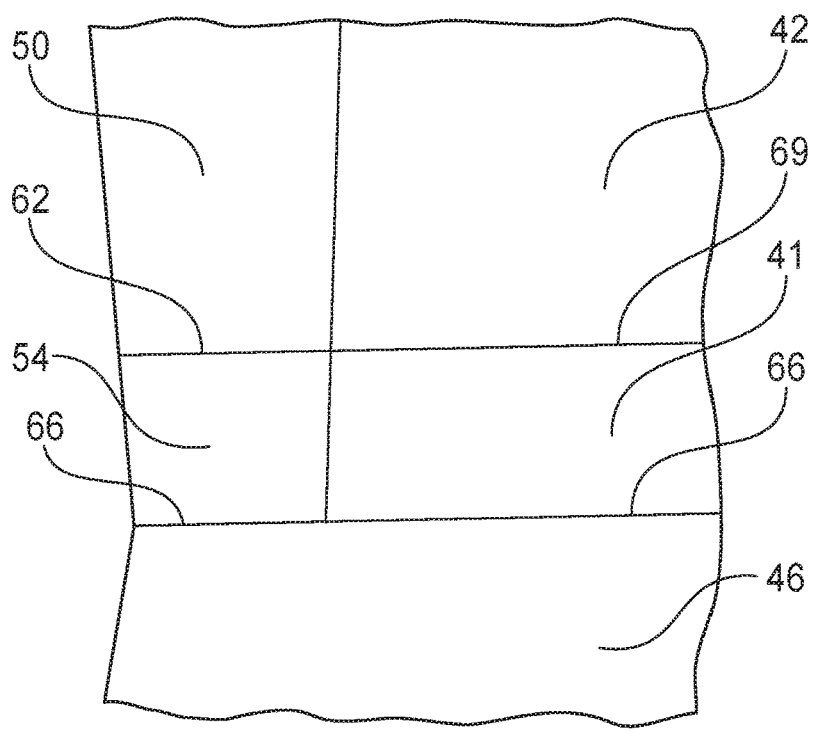
FIG. 8 is an isometric view of an upper corner region of the display project board of FIGS. 6 and 7 but in a self-standing upright orientation with the side panels swung out into a spread-apart orientation from the central panel and with the header panel in its folded in orientation.
Figure 9:
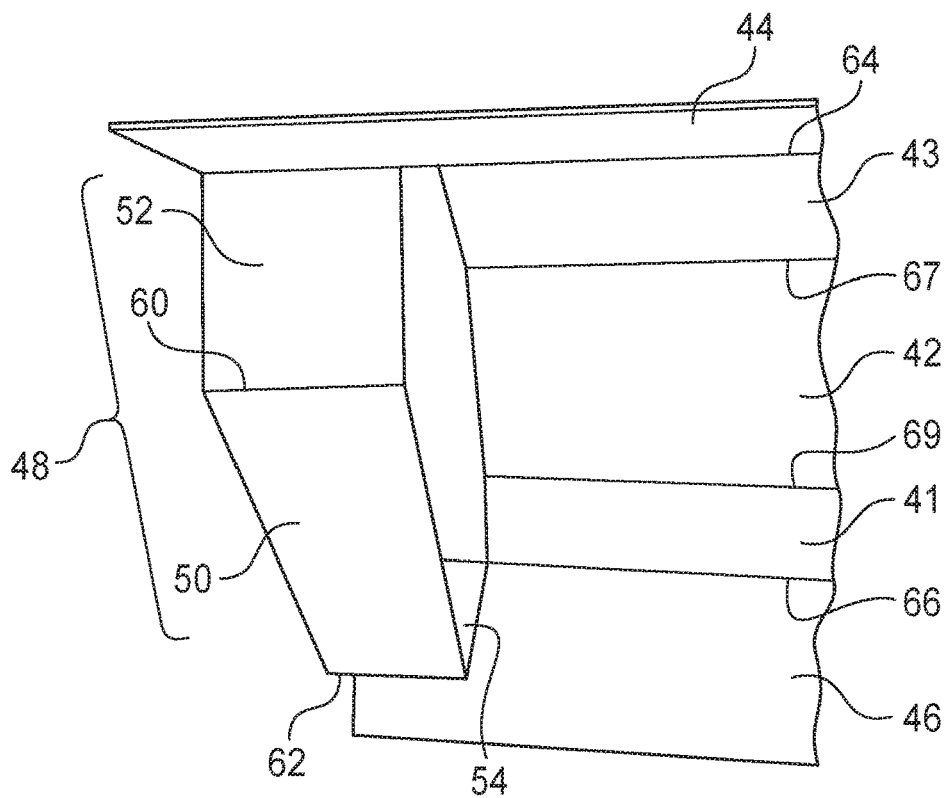
FIG. 9 is an isometric view as in FIG. 8, but with the header panel folded out.
Figure 10:
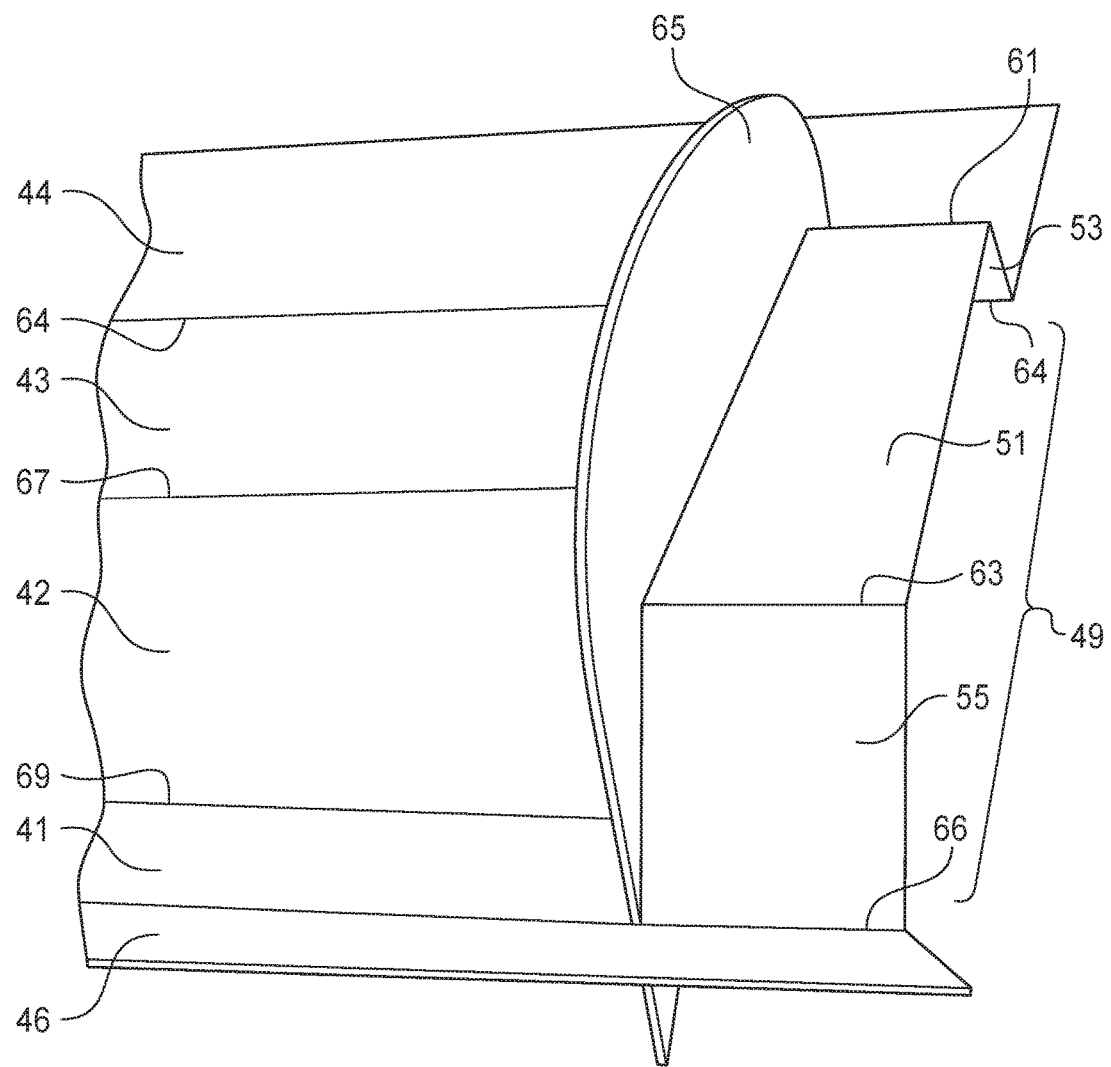
FIG. 10 is an isometric view of a lower front view of the display project board of FIG. 8.
Figure 11:
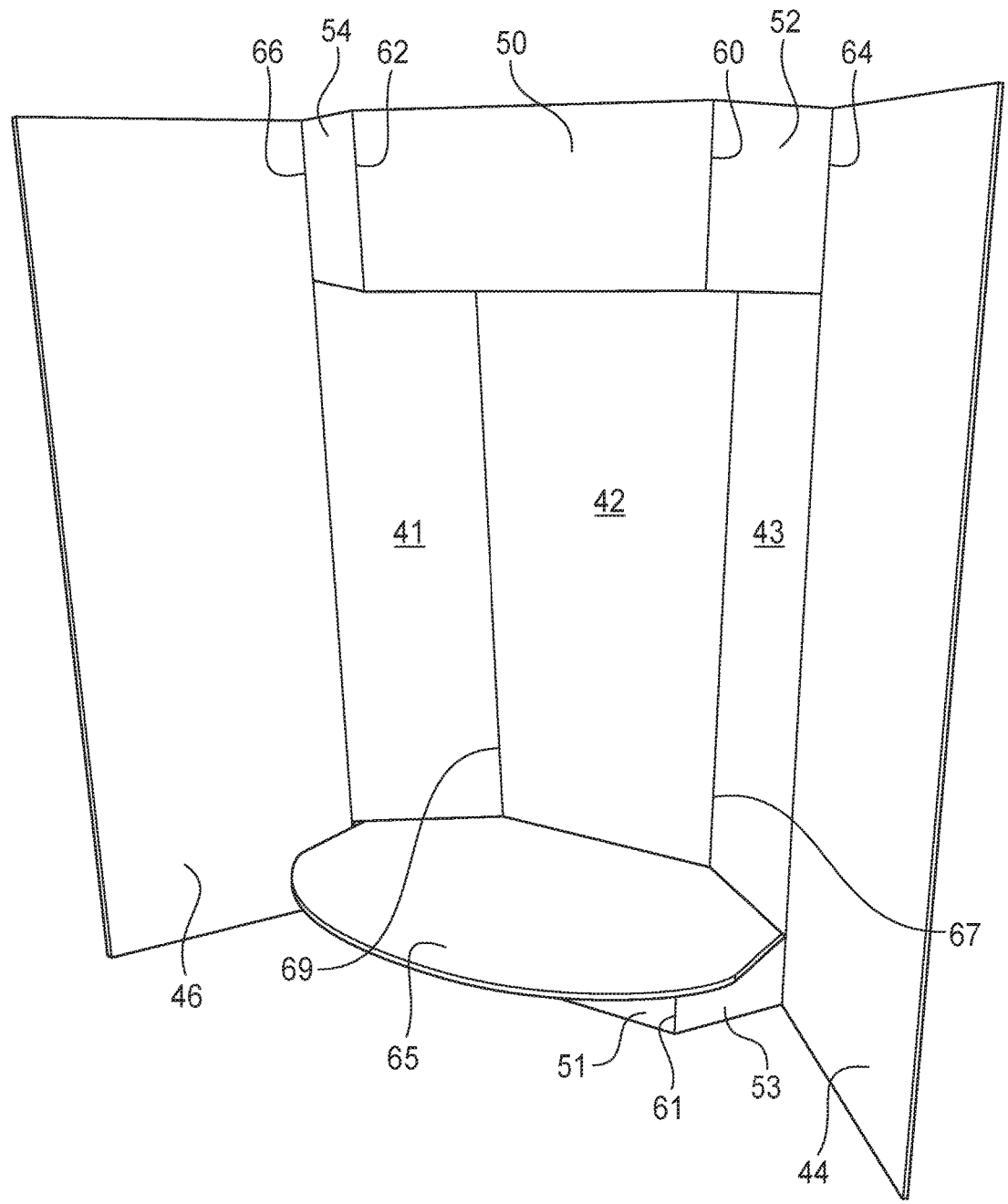
FIG. 11 is an isometric front view of the project board of FIG. 9 in a self-standing upright orientation with the header in a fold-out orientation.
Figure 12:
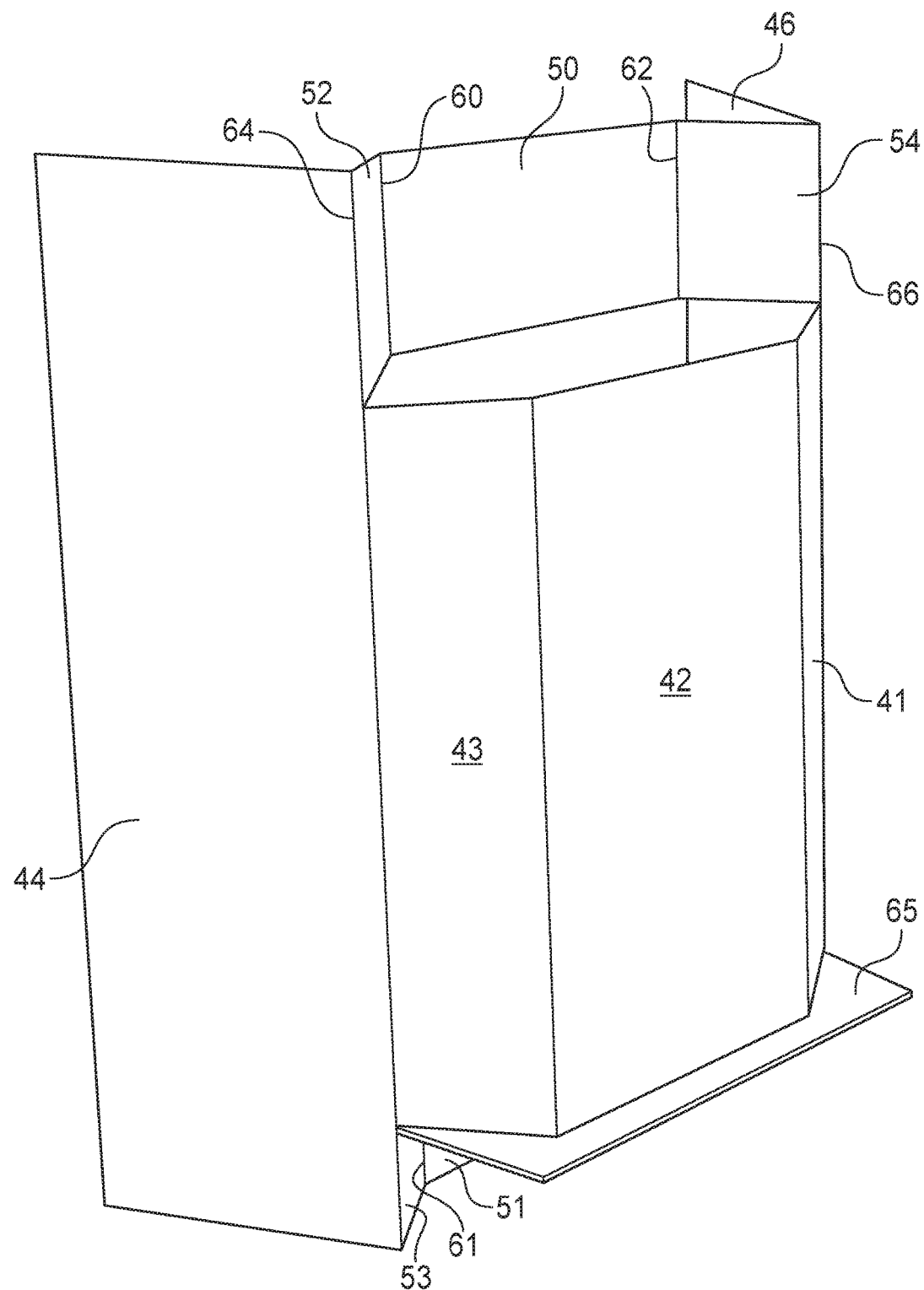
FIG. 12 is an isometric rear view of the project board of FIG. 11.

FIGS. 6-10 show a multi-panel project display board 40, which is shown in a folded state in FIGS. 6 and 7. The multi-panel project display board 40 has a central panel 42 between two side panels 44, 46 and has a header panel 48 (FIG. 9) and a footer panel 49 (FIG. 10). The header panel 48 and the footer panel 49 each have their own long segment 50, 51 between a respective pair of shorter segments 52, 54 and 53, 55. A platform 65 is provided that is placed atop the footer panel 49 and beneath the central panel and two transition panels 41, 43. That way, the platform 65 becomes wedged against tipping forward in the event weight is applied to the forward end of the platform 65. That is, the underside of the central panel 42 and the two transition panels 41, 43 help to counter any tipping force that may be applied in the downward direction toward the front of the platform 65.

The multi-panel project display board 40 may be formed from two linerboards spaced from each by a medium, which may be corrugated cardboard, corrugated fiberboard, corrugated paperboard, foam core and/or cork core. One of the linerboards may be mottled and other non-mottled. The mottled linerboard may be any conventional model white linerboard, whether from bleached pulp or white grades of recycled fiber. For example, GP Harmon is one supplier of a mottled white top linerboard for which the top ply (approximately 20 percent) on a white top sheet is made from bleached pulp or white grades of recycled fiber. The non-mottled linerboard may be uncoated paperboard.

In accordance with the invention, all the creases may be of the same type construction or of various types of construction, such as crushed scores, rear linerboard penetrating slits, front linerboard penetrating slits, or alternating full penetrating slits on either side of beaded portions. It should be understood that the full penetrating slits penetrate both the front and rear linerboard, but the rear linerboard penetrating slits would not penetrate the front linerboard the front linerboard penetrating slits would not penetrate the rear linerboard.

As concerns foamboard, the subject matter from U.S. patent application publication no. US 2011/0239,505 A1 and US patent application publication no. US 2012/0251816 A1 are incorporated herein by reference both of which being filed on behalf of Royal Consumer Products LLC. The former patent application mentions a multi-panel display has at least two foamboard panels with a foam core and outer layers, and a web hinge connecting adjacent foamboard panels. The latter patent mentions a multi-layer construction of foamboard that has high integrity and durability because it addresses the problem of paper that can separate from the foam core, particularly at the corners. If desired, the web hinges may be dispensed with in accordance with the invention and instead creases may be formed by slitting one of the liner panels and cutting through the foam core. If desired, a cork core may be substituted for the foam core.

The multi-panel display project board 40 has multiple panels that may be unfolded from the fully folded orientation of FIGS. 6-7 into their deployed orientation of FIGS. 8-13. There are panel creases 64, 66 that lie between the side panels 44, 46 and respective ones of transition panels 41, 43.

Initially, the multi-panel display board 40 is held in an upright orientation manually and then its side panels 44, 46 are pivoted manually about panel creases 64, 66 to reach their deployed orientation. In the deployed orientation, the side panels 44, 46 define preferably obtuse angles of inclination with the central panel 42 as shown in FIGS. 8-13.

Next, the header panel 48 and the footer panel 49 are deployed. To do so, each is flexed manually so that the angle of inclination between the long segments 50, 51 and associated pairs of shorter segments 52, 54 and 53, 55 accordingly becomes reflex and no longer obtuse as they would have been when in alignment with the central panel 42 and two transition panels 41, 43.

Both the header panel 48 and the footer panel 49 have the same length that extends between the panel creases 64, 66 and do not extend into the side panels 44, 46.

The side panels 44, 46 of the multi-panel board of the invention are foldable between a fully folded orientation and their obtuse angular orientation so that in the fully folded orientation, the two side panels 44, 46 fold over respective ones of the panel creases 56, 58 to lie over the central panel 42 and two transition panels 41, 43 as applicable. They also lie over the header panel 49 and the footer panel 49.

The header panel 48 (FIG. 9) is foldable from a fold-in orientation (FIG. 8) and a fold-out orientation (FIG. 9) so that in the fold-in orientation, the long segment 50 is in alignment with the central panel 42 and in the fold-out orientation, the long segment 50 is further away from the central panel 42 than are the shorter segments 52, 54 from the central panel 42. The footer panel 49 is likewise foldable from a fold-in orientation to a fold-out orientation with its long segment 51 moving further away from the central panel 42 than are the shorter segments 53, 55.

Figure 14:
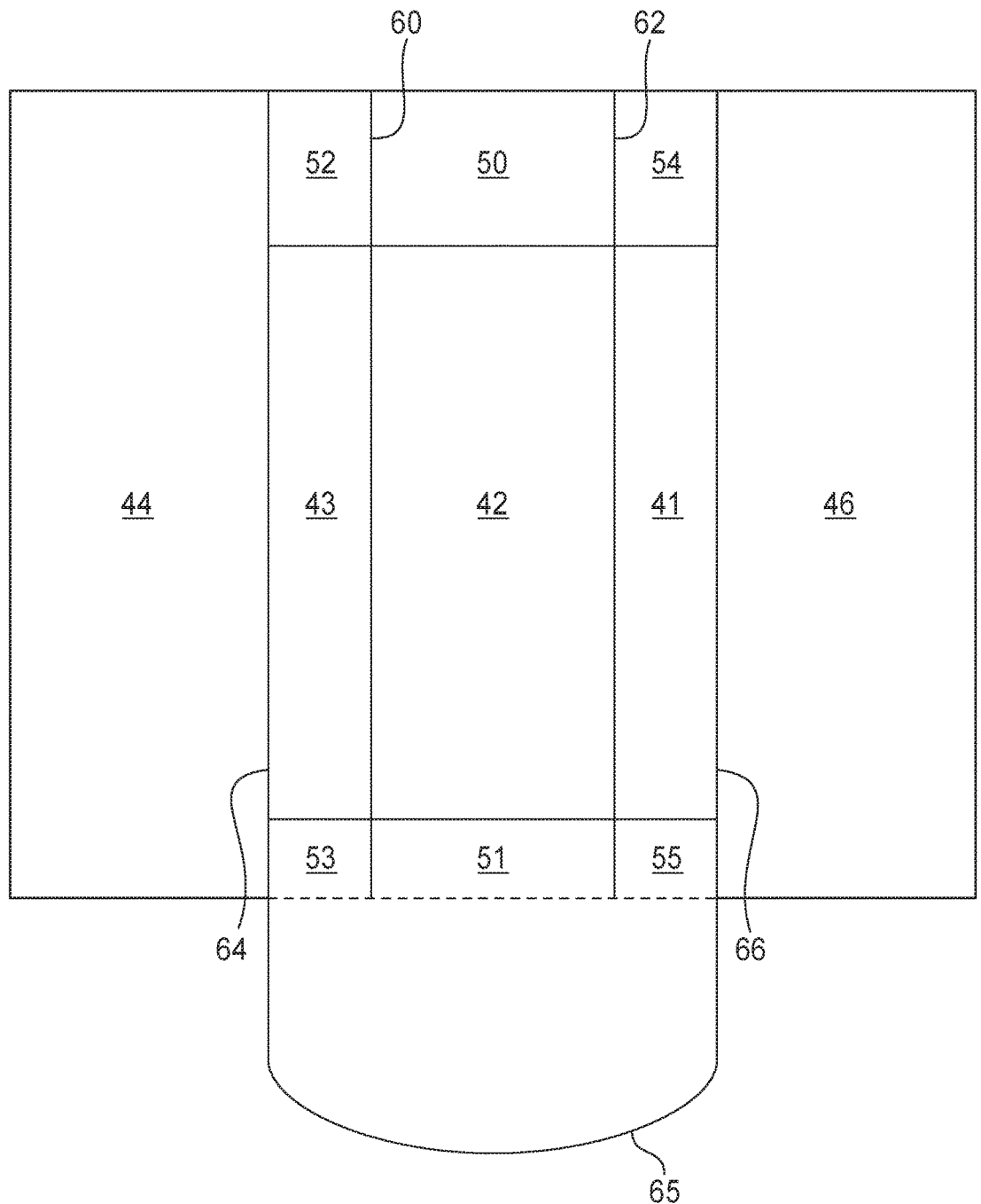
FIG. 14 is a front view of a blank in accordance with an embodiment the invention in which the platform is attached via perforations to a bottom of a footer panel.
Figure 15:
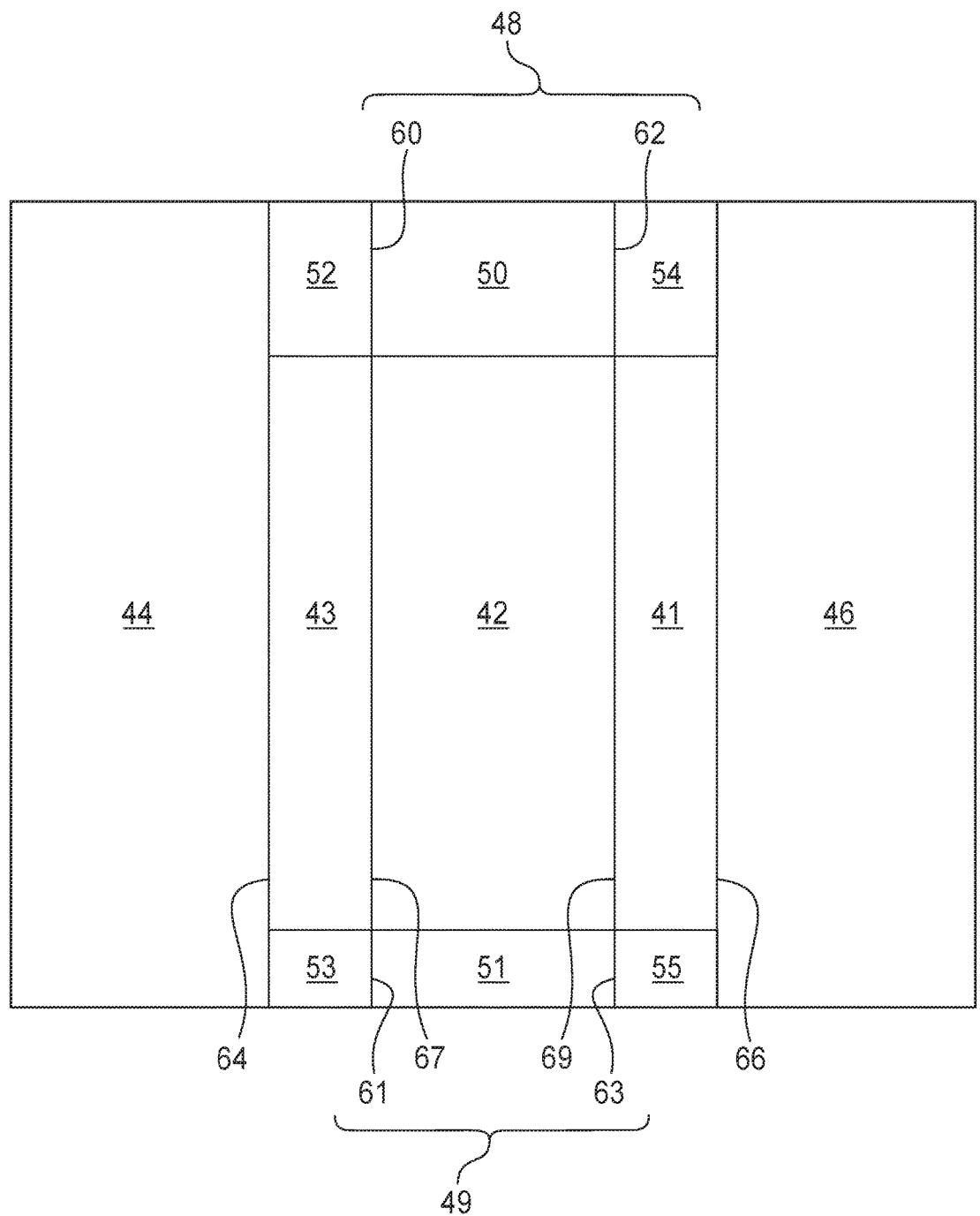
FIG. 15 is a front view of a blank in accordance with another embodiment of the invention without the platform.

FIGS. 14 and 15 show a blank in accordance with different embodiments of the invention. In the case of FIG. 14, a platform 65 is attached via perforations to the footer 49 (although could alternatively be attached to the header 48 via perforations in a like manner. The user severs the perforations so it can be placed atop the footer in its deployed orientation for use. In the case of FIG. 15, the platform 65 is not shown since it is not attached for subsequent severing but instead remains a separate piece.

For both embodiments, the panels of the multi-panel display project board 40 may be made of the same single wallboard construction as that of the conventional multi-panel display project board 10 of FIGS. 1-5. For instance, the single wallboard construction may be that of a medium sandwiched between two linerboards, with the medium being fluted or corrugated, such as corrugated paperboard, corrugated fiberboard, or corrugated cardboard, or a core such as that of a foam core found in a conventional foam board or cork core found in a conventional cork board. If corrugated, a C flute corrugation is preferred over a B flute corrugation, although a B flute corrugation is viable. Preferably, one of the linerboards is mottled and the other is non-mottled.

Figure 16:
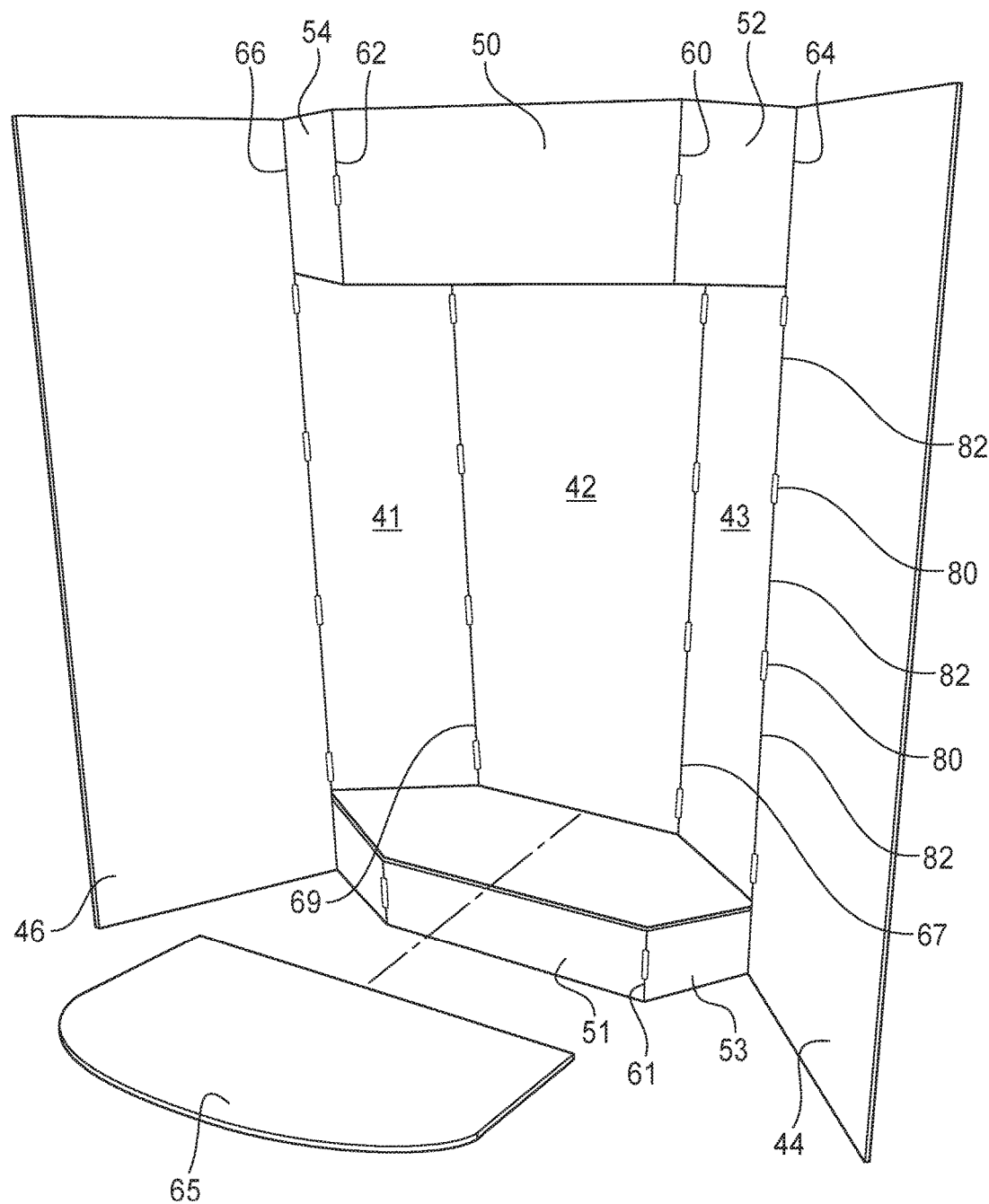
FIG. 16 is a front isometric view of a further embodiment similar to that of FIG. 11 except that the panel creases have beaded and slit portions and the platform is shown in orientation prior to placement atop the footer.

FIG. 16 shows the multi-panel project board having beaded portions 80 adjacent slit portions 82 ton either side of the beaded portions 80. Such beaded portions and slit portions 82 form the creases 60, 61, 62, 63, 64 and 66.

Figure 17:
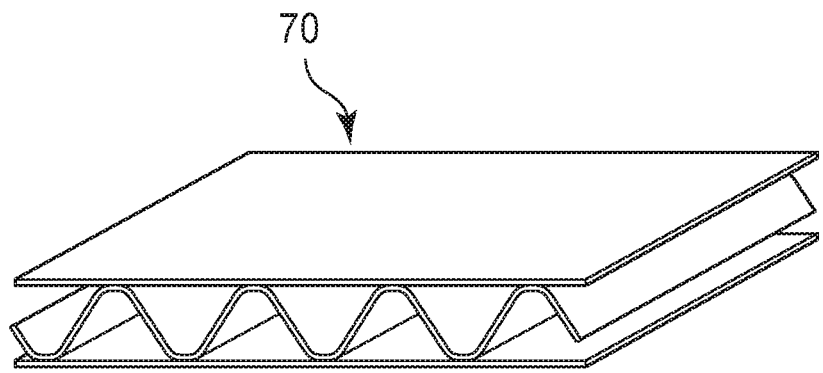
FIG. 17 is an isometric view of a conventional single wallboard having a corrugated medium sandwiched between two linerboards.
Figure 18:
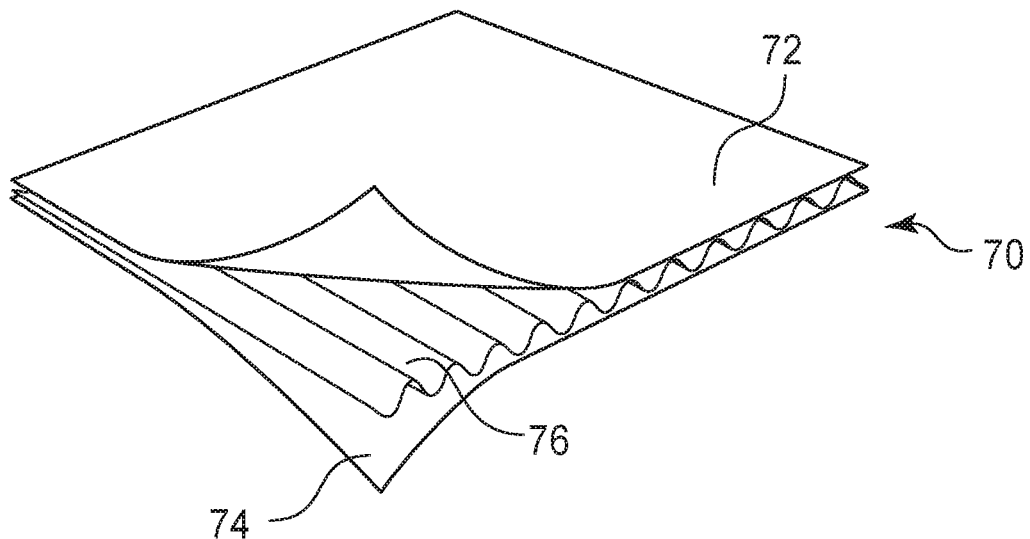
FIG. 18 is an isometric view of the conventional single wallboard of FIG. 17 with a corner edge spread apart.

FIGS. 17 and 18 show a conventional single wallboard 70 having a top outer ply surface and a bottom outer ply surface that may be two sheets of linerboard. Between the top and bottom outer ply surfaces may be glued the fluted or corrugated medium or the foam core medium.

A conventional corrugator is a large machine, made up of a series of smaller machines, which combines two different kinds of paper to create cut sheets of corrugated fiberboard. The flat, facing sheets are referred to as the liners, and the wave-like, fluted layers are known as the corrugating medium, or simply medium.

Figure 13:
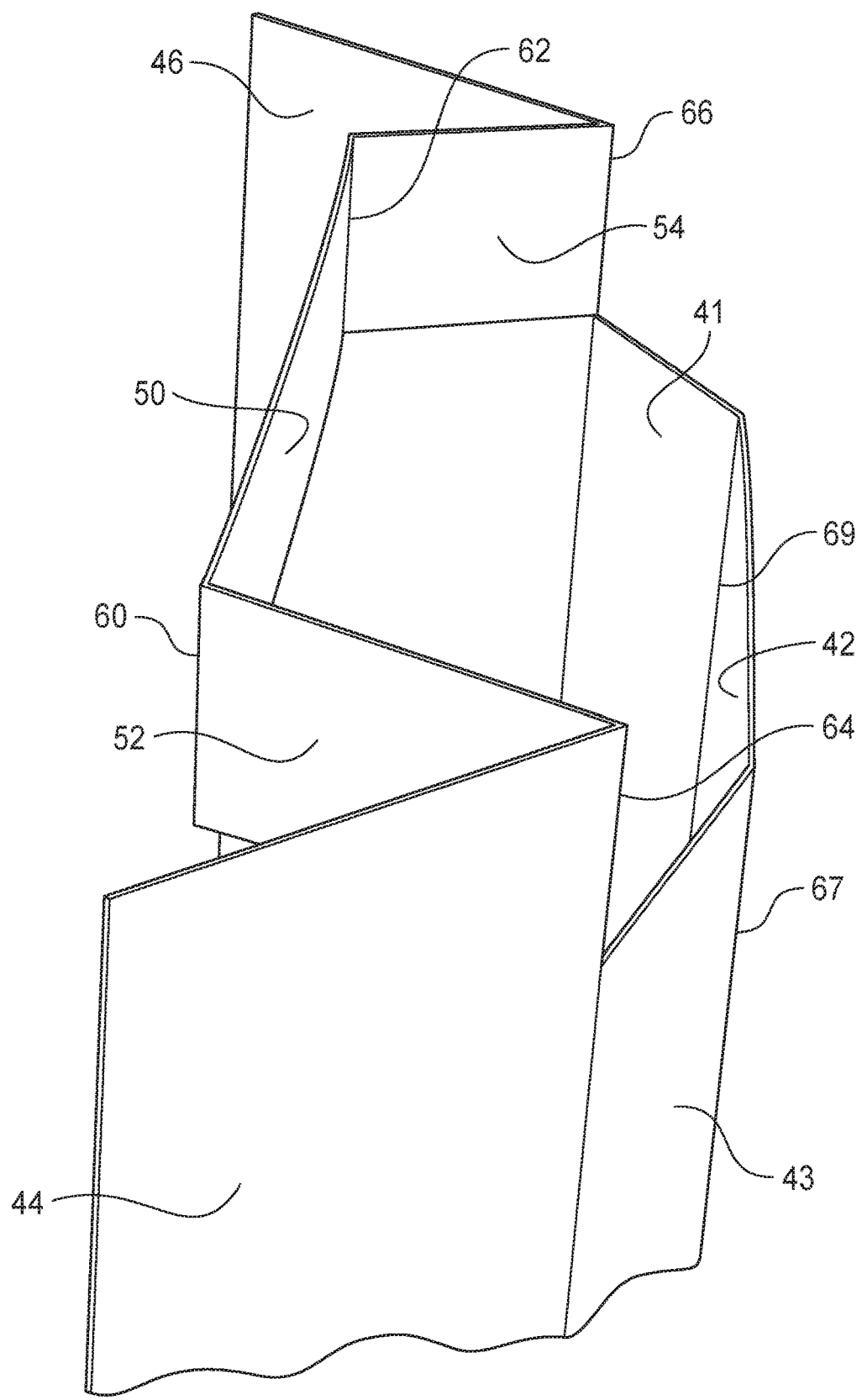
FIG. 13 is an isometric top view of the project board of FIG. 12.

As seen in FIG. 13, for instance, the central panel 42 does not rest upon the floor. Instead, the footer 40 rests on the floor in its fold-out orientation. Further, the transition panels 41, 43 may each form obtuse angles of inclination with the central panel 42. The side panels 44, 46 (see FIGS. 9, 10) are spaced from the central panel 42 because of the transition panels 41, 43. Thus, the transition panels 41, 43 may have an angle of inclination that is obtuse relative to the central panel 51.

For all the embodiments, the side panels 44, 46 could either be in alignment with the transition panels 41, 43 or angled relative thereto at any desired obtuse angle of inclination. Indeed, the central panel 51 and the two side panels 44, 46 could even be oriented to be parallel with each other so that the two side panels 44, 46 would define an angle of inclination of 180 degrees. Indeed, the two side panels 44, 46 could be oriented at any acute angle since they are movable into a fully folded orientation to overlay the central panel 42 and two transition panels and thereby define an angle of inclination of zero degrees. Further, the side panels 44, 46 could be pivoted beyond 180 degrees into the realm of reflex angles of inclination to the extent that the transition creases allow.

While the foregoing description and drawings represent the preferred embodiments of the present invention, various changes and modifications made be made without departing from the scope of the present invention.

What is claimed is:

1. A multi-panel display project board comprising:
   a plurality of panels separated from each other in succession by neighboring ones of creases, the plurality of panels including at least one central panel, two transition panels and a pair of side panels that are arranged so that the pair of side panels pivot about the neighboring ones of creases between a fully folded condition and a deployed condition, wherein:
   in the deployed position, the pair of panels to spread apart from each other, and-out panel configured to flex between a fold-in orientation and a fold-out orientation by pivoting about the respective pair of the creases, the fold-out panel having neighboring segments that define a reflex angle of inclination in the fold-out orientation and non-reflex angle of inclination in the fold-in orientation,
   in the fully folded position, the pair of panels collectively overlie all remaining ones of the panels; and
   wherein the plurality of panels include at least one fold-out panel configured to flex between a fold-in orientation and a fold-out orientation by pivoting about a respective pair of segment creases, the fold-out panel having neighboring segments that define a reflex angle of inclination in the fold-out orientation and non-reflex angle of inclination in the fold-in orientation,
   the central panel being between the two transition panels, the two transition panels being between the central panel and the two side panels, the neighboring segments of the at least one fold-out panel including a long segment and two shorter segments, wherein:
   in the fold-in condition, the at least one fold-out panel has the shorter segments in alignment with respective ones of the transition panels and has the long segment in alignment with the central panel.

2. The multi-panel display project board of claim 1, wherein in the deployed condition, the pair of side panels each define an obtuse angle of inclination relative to at least one of two transition panels.

3. The multi-panel display project board of claim 1, wherein the two transition panels each define respective angles of inclination with the central panel that are obtuse.

4. A multi-panel display project board, comprising
   a plurality of panels configured to pivot about respective creases between neighboring ones of the panels, the plurality of panels including two side panels, a central panel between two transition panels, the two transition panels being between the central panel and the two side panels, and a further panel configured to flex between a fold-in orientation and a fold-out orientation by pivoting about neighboring ones of the creases, the further panel having neighboring segments that define a reflex angle of inclination in the fold-out orientation and non-reflex angle of inclination in the fold-in orientation; and a platform attached to at least one the plurality of panels in a detachable manner, the platform after detachment being configured to be positioned in a stable manner upon the further of the panels when the further panel in the fold-out orientation and simultaneously extending beneath the transition panels.

5. A multi-panel display project board, comprising
a platform; and
a plurality of panels separated from each other in succession by neighboring ones of creases, the plurality of panels including at least one central panel and a pair of side panels arranged so that the pair of side panels pivot about the neighboring ones of the creases,
wherein the plurality of panels include a footer panel configured to flex between the fold-in orientation and the fold-out orientation, the footer panel having neighboring segments separated from each other in succession by segment creases that define reflex angles of inclination in the fold-out orientation at the segment creases and non-reflex angles of inclination at the segment creases in the fold-in orientation, the platform resting upon the footer panel in the fold-out orientation and simultaneously extending underneath at least one of the plurality of panels.

6. The multi-panel display project board of claim 5, wherein each of the plurality of panels is of a single wallboard that has a medium between two linerboards, the medium being selected from the group consisting of corrugated cardboard, corrugated fiberboard, corrugated paperboard, foam core and cork core.

7. The multi-panel display project board of claim 5, wherein one of the linerboards is mottled and a remaining one of the linerboard is non-mottled.

8. The multi-panel display project board of claim 5, wherein each of the plurality of panels have front and rear linerboards between which is a medium, the plurality of creases including crushed score lines.

9. The multi-panel display project board of claim 5, wherein each of the plurality of panels have front and rear linerboards between which is a medium, wherein one of the linerboards and the medium are slit, the plurality of creases including a creased portion in a remaining one of the linerboards that is adjacent the slit.

10. The multi-panel display project board of claim 5, wherein each of the plurality of panels have front and rear linerboards between which is a medium, the plurality of creases including a plurality of beaded portions separated from each other in succession by intervening slits that penetrate the front and the rear linerboard as well as penetrating the medium.

11. The multi-panel display project board of claim 5, the plurality of panels also include two transition panels, the central panel being between the two transition panels, the two transition panels being between the central panel and the two side panels, the platform simultaneously extending underneath the two transition panels and the central panel while resting upon the footer panel in the fold-out orientation.

12. The multi-panel display project board of claim 11, wherein the plurality of-panels also include a header panel, the header panel and the footer panel each extending from both of the transition panel creases, the header panel also being configured to flex between fold-in and fold-out orientations and have segment creases between neighboring segments so as to define a reflex angle of inclination in the fold-out orientation between the neighboring segments of the header panel at the segment creases of the header panel and a non-reflex angle of inclination in the fold-in orientation between the neighboring segments of the header panel at the segment creases of the header panel.

13. A multi-panel display project board, comprising:
a platform; and
a plurality of panels and a plurality of creases that are arranged so that each of the panels pivot about neighboring ones of the creases, the plurality of panels including a pair of side panels configured to pivot about a respective pair of the creases,
wherein the plurality of panels include a header panel and a footer panel both configured to flex between a fold-in orientation and a fold-out orientation by pivoting about the respective creases, the footer panel and the header panel each having neighboring segments between which define a reflex angle of inclination in the fold-out orientation at segment creases and a non-reflex angle of inclination in the fold-in orientation at the segment creases;
wherein the plurality of panels also include a central panel between two transition panels, the two transition panels separating the central panel from the two side panels, the plurality of creases including transition creases between the central panel and the two transition panels and including panel creases between the two transition panels and the two side panels; and
wherein the platform is configured to deploy in an elevated manner and to rest upon and be supported by the footer panel underneath in the fold-out orientation and simultaneously extend underneath the two transition panels and the central panel.

* * * * *